E. C. HUDSON.
TRACTOR PLOW.
APPLICATION FILED AUG. 25, 1917.
1,257,236.
Patented Feb. 19, 1918.
3 SHEETS—SHEET 1.
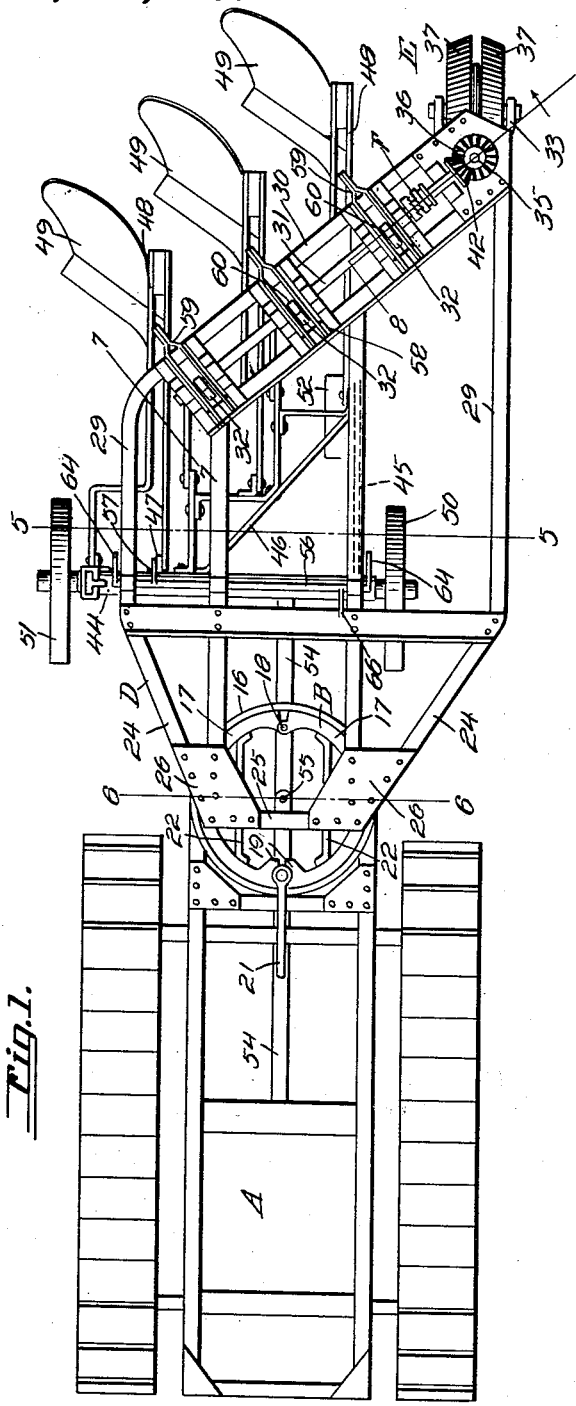
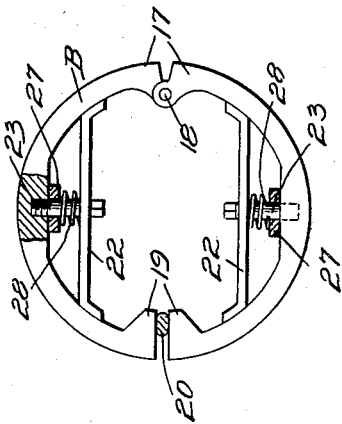
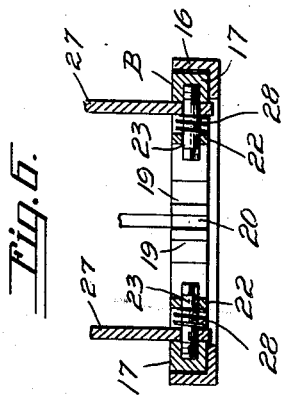
WITNESSES
F. C. Gibson.
INVENTOR
Emery C. Hudson.
BY Victor J. Evans
ATTORNEY

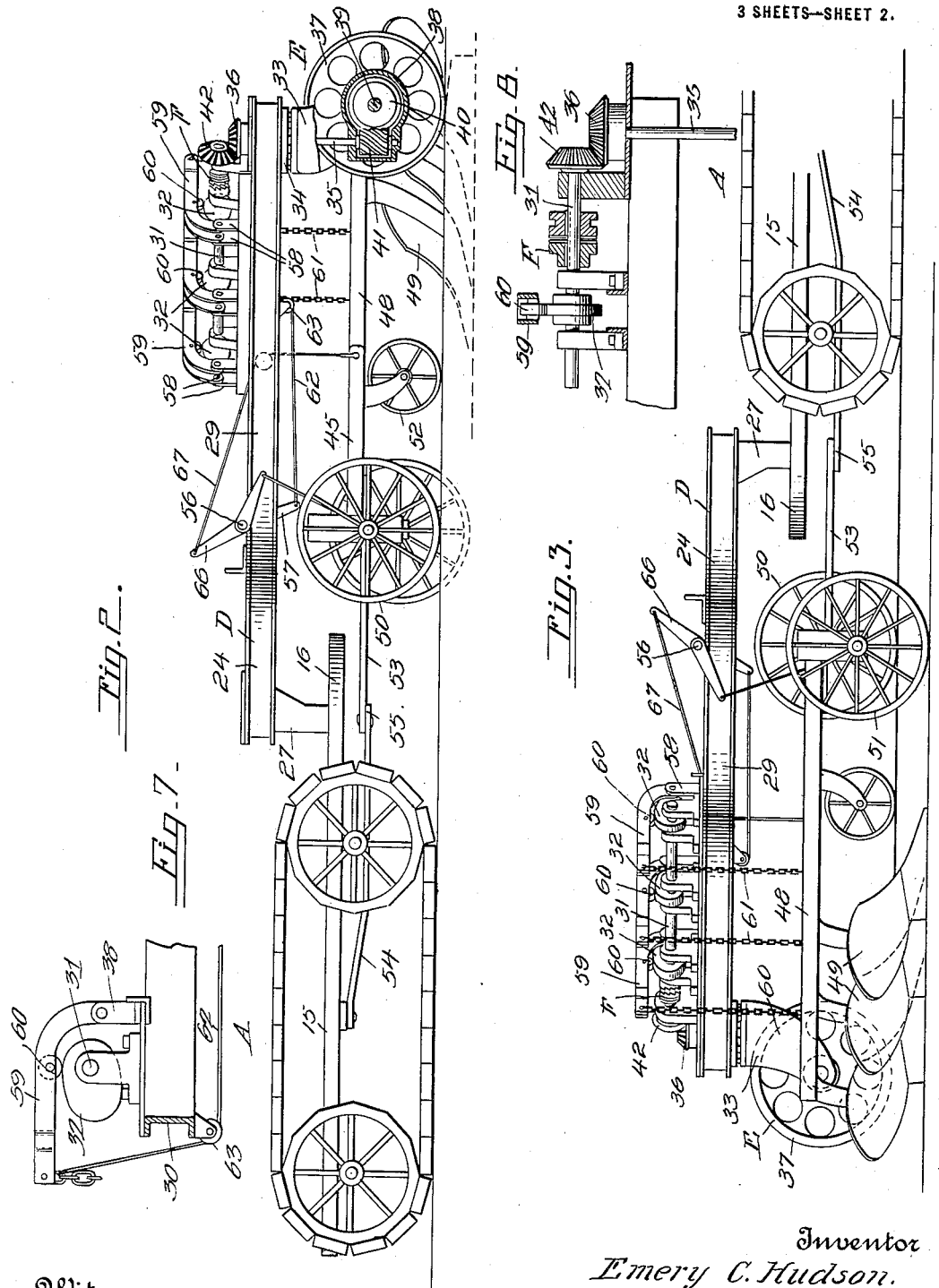

E. C. HUDSON.
TRACTOR PLOW.
APPLICATION FILED AUG. 25, 1917.

1,257,236.

Patented Feb. 19, 1918.

Witness
F. C. Gibson.

Inventor
Emery C. Hudson.

By Victor J. Evans
Attorney

UNITED STATES PATENT OFFICE.

EMERY C. HUDSON, OF BELLEFONTAINE, OHIO.

TRACTOR-PLOW.

1,257,236.  Specification of Letters Patent.  Patented Feb. 19, 1918.

Application filed August 25, 1917. Serial No. 188,165.

*To all whom it may concern:*

Be it known that I, EMERY C. HUDSON, a citizen of the United States, residing at Bellefontaine, in the county of Logan and State of Ohio, have invented new and useful Improvements in Tractor - Plows, of which the following is a specification.

This invention relates to tractor plows and it has for its object to produce an organized machine of simple and improved construction embodying a main frame, connecting means between said main frame and the tractor, a plow carrying frame, and means for effecting adjustment of the plows and the plow carrying frame to raise or lower the plows with respect to the ground.

A further object of the invention is to simplify and improve the connecting means of the main frame with the tractor.

A further object of the invention is to simplify and improve the construction of the main frame and the manner of supporting the same.

A further object of the invention is to simplify and improve the construction and arrangement of the plow carrying frame and the plows.

A further object of the invention is to simplify and improve the construction, arrangement and operation of the plow adjusting means.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a top plan view of the machine embodying the invention showing only a portion of the tractor.

Fig. 2 is a view in side elevation of the machine as seen in Fig. 1.

Fig. 3 is a side elevation showing the opposite side of the machine.

Fig. 6 is a sectional detail view taken on the line 6—6 in Fig. 1.

Fig. 7 is a sectional detail view taken on the line 7—7 in Fig. 1.

Fig. 8 is a sectional detail view taken on the line 8—8 in Fig. 1.

Fig. 9 is a plan view of the clutch ring whereby the main frame is connected with the tractor.

Corresponding parts in the several figures are denoted by like characters of reference.

Figure 4:
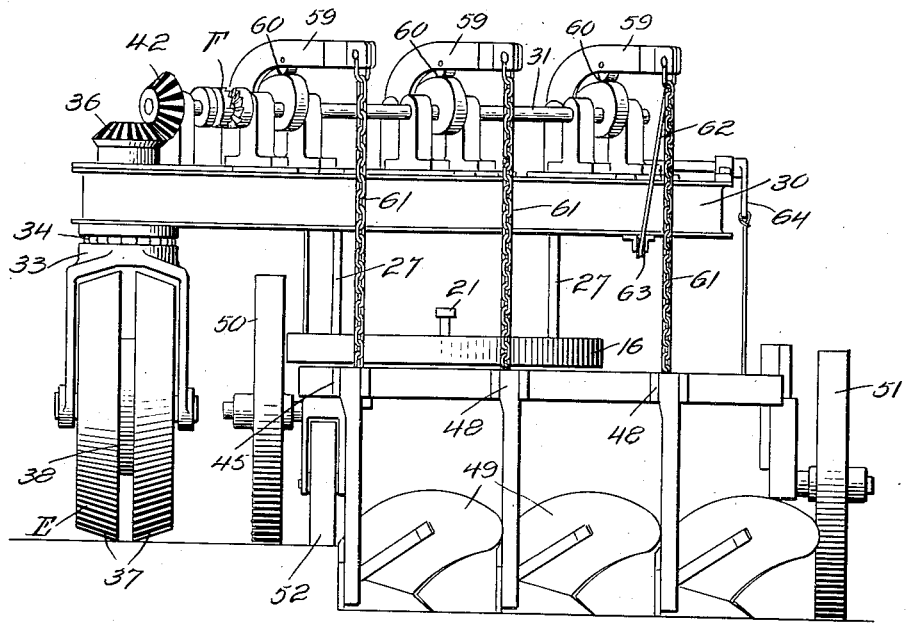
Fig. 4 is a rear elevation.
Figure 5:
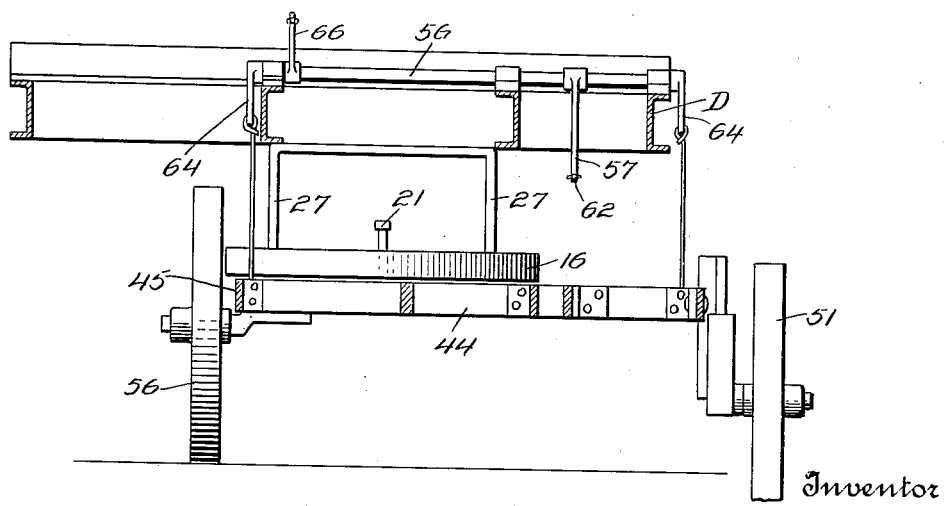
Fig. 5 is a transverse sectional view taken on the line 5—5 in Fig. 1.

Referring to the drawings, A represents a portion of a tractor which may be of any desired type or general construction. In the drawings, a tractor of the caterpillar type has been shown, but no limitation is made to this peculiar style or type.

The tractor frame 15 supports near its rearward end a circular track or turn-table 16 within which is mounted a clutch ring B comprising two approximately semi-circular members 17 connected together by a hinge 18 and provided adjacent to their free ends with lugs or blocks 19 between which is introduced a cam member 20 operable in any convenient manner by means of a lever 21 and by the action of which the members of the clutch ring may be extended relatively to the circular track C for the purpose of locking the clutch ring in position with respect to said track. Each member of the clutch ring has a longitudinal brace 22 through which a pin 23 extends in threaded engagement with the body of the clutch member about midway between the ends thereof.

The main frame of the machine which is generally designated by D is provided with forwardly convergent side member 24 which are connected together by a front bar 25 strongly reinforced by reinforcing plates 26. Each of the side members 24 has a downwardly extending bracket 27 adapted for engagement with one of the pins 23. Springs 28 may be coiled about the pins 23 for the purpose of taking up lost-motion. The pins 23 may be readily detached for the purpose of connecting the frame D with or disconnecting it from the clutch ring, as required. The main frame D includes parallel side beams 29 which extend rearwardly with respect to the convergent side beams 24, and the side beam at the land side being of a length considerably exceeding that of the side beam at the farther side. The latter is connected with the side beam at the land side by means of an obliquely disposed rear beam 30. The component beams of the main frame may be angle beams, channel beams or may consist of structural iron or steel of any suitable well known type. It is also to be understood that in the construction of the said main frame, braces, brackets and other like reinforcing and supporting means may be included wherever it shall be found desirable and necessary.

Supported on the main frame in substantially parallel relation to the obliquely disposed rear beam 30 is a shaft 31 carrying a series of cams 32. The rearward portion of the main frame is supported on a caster wheel E, the same being mounted for rotation in a carrying fork 33 which is supported for rotation in a horizontal plane with respect to the main frame and with which said fork is connected by means including an anti-friction thrust joint 34. A vertical shaft 35 extends axially through the supporting means of the fork 33 and said shaft carries at its upper end, which extends above the frame D, a beveled gear 36. The wheel E is composed of two parts or members 37 between which is included an oil case 38 containing the lower end of the shaft 35 which is stepped interiorly of said case. The axle 39 of the wheel and the shaft 35 are provided with inter-meshing gears 40, 41 of the well known worm type whereby when the wheel is rotated, rotary motion will be imparted to the shaft 35 and from the latter to the shaft 31 which carries a beveled gear 42 meshing with the beveled gear 36. The shaft 31 is equipped with a clutch device F which may be of any desired type and whereby it may be operatively connected with or disconnected from the beveled gear 42 so that, while the rotation of said beveled gear is continuous when the machine is in operation, the rotation of the shaft 31 may be interrupted at will. For the purpose of controlling the operation of the clutch a suitable lever and connections may be provided, but such means are well known in the art and do not require to be particularly shown or described.

The plow carrying frame is composed mainly of an axle 44, a side beam 45 positioned at the land side of the machine and an obliquely disposed brace 46 which coöperates with the axle and the side beam to form a substantially triangular frame having brackets 47 with which a plurality of plow beams 48 are hingedly connected. In the example shown in the drawings, three plow beams have been shown, each carrying a plow body 49, but the number may obviously be varied at will. The frame is supported at its forward end by a land wheel 50 and a furrow wheel 51, and the rearward end of the frame is preferably supported on a caster wheel 52. The furrow wheel is connected with the axle in such a manner as to permit vertical adjustment, means of any well known kind being provided for effecting adjustment of the wheel relatively to the plow carrying frame. The plow carrying frame is connected with the tractor by means of a draft bar composed of two parts or members 53, 54 which are pivotally connected together at 55, centrally with respect to the clutch ring and the track 16, for convenience in turning.

Supported on the main frame B near the forward end thereof, is a rock shaft 56 having a downwardly extending arm 57, the main frame being also provided to the rearward of the shaft 31 with uprights 58 each of which carries a forwardly extending arcuate lever 59 carrying an anti-friction member such as a roller 60 which is engaged by one of the cams 32. Each of the levers 59 is connected by a flexible element such as a chain 61 with one of the plow carrying beams 48. One of the levers 59, preferably the one located nearest the furrow side of the machine is connected with the arm 57 of the rock shaft 56 by means of a cable 62 trained over a pulley 63 so that when said lever 59 is actuated by one of the cams 32, motion will be transmitted to the rock shaft 56. The rock shaft 56 is provided with upwardly and forwardly extending arms 64, said arms normally extending in the direction of the axle 44 and above the same, each of said arms being connected with one end of the axle by a flexible element such as a cable or link 65. The rock shaft 56 has an additional arm 66 which is connected with the rearward end of the plow carrying frame by means of a flexible element such as a cable 67 which is trained over a guide pulley 68 on the main frame of the machine.

From the foregoing description taken in connection with the drawings hereto annexed, it will be apparent that when the machine is in operation the clutch device F may be actuated so as to cause rotation of the shaft 31, the cams 32 on said shaft serving to exert upward pressure against the levers 59, thereby lifting the plow bottoms from the ground. At the same time motion will be transmitted through the medium of the cable 62 from one of the levers 59 to the rock shaft 56 which will be partly rotated, swinging the arms 64 and 66 in an upward and rearward direction, thereby lifting the axle 44 and the plow carrying frame bodily from the ground. When in this position the plows and their carrying frame may be conveniently transported from place to place, and this operation is also resorted to when the machine is to make a right-angle turn at the end of a furrow, it being obvious that the plows being raised from the ground a sharp turn may easily be made. When such turn is made the clutch ring B is engaged with the track C so that the plow carrying frame will be held securely in alinement with the tractor. When the machine is in actual plowing operation the clutch ring B is disengaged from the track C so that the steering movements and the variations of the tractor from the edge of the furrow will not interfere with the running of the plows when the machine is to be turned at the corner of a field where the turning movement is liable to be obstructed by a fence or in any other way, the clutch ring may be disconnected from its track and, the plows having been previously raised from the ground, a sharp turn may be effected with slight maneuvering.

I claim:—

1. In a tractor plow, a main plow frame, supporting means for said frame including a tractor frame with which the forward end of the main plow frame is connected for swinging movement in a horizontal plane and a caster wheel on which the rearward end of said main plow frame is supported, an auxiliary plow carrying frame mounted beneath the main frame and having independent supporting wheels, a shaft supported for rotation on the main plow frame and deriving motion from the caster wheel by means including a clutch whereby the motion may be interrupted at will, plow carrying beams hingedly connected with the auxiliary frame, and means operable by the driven shaft for lifting the rearward ends of the plow beams.

2. In a tractor plow, a main plow frame, supporting means for said frame including a tractor frame with which the forward end of the main plow frame is connected for swinging movement in a horizontal plane and a caster wheel on which the rearward end of said main plow frame is supported, an auxiliary plow carrying frame mounted beneath the main frame and having independent supporting wheels, a shaft supported for rotation on the main plow frame and deriving motion from the caster wheel by means including a clutch whereby the motion may be interrupted at will, plow carrying beams hingedly connected with the auxiliary frame, means operable by the driven shaft for lifting the rearward ends of the plow beams, and means operable from said driven shaft for bodily lifting the auxiliary frame with which the front ends of the plow beams are connected.

3. In a tractor plow, a main plow frame, supporting means for the same including a caster wheel, an auxiliary plow frame, wheels on which said auxiliary frame is independently supported, plow carrying beams hingedly connected with the auxiliary frame, a shaft supported for rotation on the main plow frame and deriving motion from the caster wheel, cams on said shaft, levers fulcrumed on the main plow frame in engagement with the cams, flexible connections between said levers and the plow beams, and means for interrupting the rotation of the driven shaft.

4. In a tractor plow, a main plow frame, supporting means for the same including a caster wheel, an auxiliary plow frame, wheels on which said auxiliary frame is independently supported, plow carrying beams hingedly connected with the auxiliary frame, a shaft supported for rotation on the main plow frame and deriving motion from the caster wheel, cams on said shaft, levers fulcrumed on the main plow frame in engagement with the cams, flexible connections between said levers and the plow beams, means for interrupting the rotation of the driven shaft, a rock shaft supported on the main plow frame and operatively connected with one of the cam actuated levers, arms extending from the rock shaft, and flexible connections between said arms and the auxiliary frame whereby said auxiliary frame may be bodily lifted simultaneously with the lifting of the plow carrying beams.

In testimony whereof I affix my signature.

EMERY C. HUDSON.